United States Patent [19]

Stoy

[11] 4,228,056

[45] Oct. 14, 1980

[54] SHAPED ARTICLES FROM INSOLUBLE HYDROGELS AND METHOD OF MANUFACTURING SAME

[75] Inventor: Artur Stoy, Prague, Czechoslovakia

[73] Assignee: Ceskoslovenska akademie ved, Prague, Czechoslovakia

[21] Appl. No.: 910,449

[22] Filed: May 30, 1978

Related U.S. Application Data

[63] Continuation-in-part of Ser. No. 526,718, Nov. 25, 1974, abandoned, which is a continuation-in-part of Ser. No. 319,309, Dec. 29, 1972, abandoned, which is a continuation of Ser. No. 43,926, Jun. 5, 1970, abandoned.

[30] Foreign Application Priority Data

Jun. 13, 1969 [CS] Czechoslovakia ................... 4200-69

[51] Int. Cl.² .......................... B29C 3/00; C08L 35/04
[52] U.S. Cl. ......................... 260/29.6 AN; 252/316; 260/29.6 MM; 260/29.6 TA; 264/299; 526/221; 526/341
[58] Field of Search .............. 252/316; 260/29.6 AN, 260/29.6 TA, 29.6 MM; 526/221, 341; 264/299

[56] References Cited

U.S. PATENT DOCUMENTS

| | | | |
|---|---|---|---|
| 2,648,593 | 8/1953 | Stanton et al. | 424/DIG. 6 |
| 2,763,636 | 9/1956 | Davis | 526/91 X |
| 2,968,558 | 1/1961 | Clavier et al. | 260/29.6 AN X |
| 3,242,120 | 3/1966 | Steuber | 260/29.6 MM |
| 3,345,350 | 10/1967 | Shavit et al. | 526/341 X |

OTHER PUBLICATIONS

G. S. Newth: "Manual of Chemical Analysis–Qualitative and Quantitative", Tenth Impression, Longmans, Green and Co., 1914, p. 55.

*Primary Examiner*—Richard D. Lovering

[57] ABSTRACT

Substantially water-insoluble, water-swellable crosslinked hydrogels are prepared by polymerizing monomeric material consisting predominantly of acrylonitrile in aqueous salt solution containing zinc chloride as the main component, in absence of added crosslinking agents. The concentration of acrylonitrile is in the range of about 20 to about 40% by weight, related to the weight of the polymerization batch as a whole 100%. The process is carried out by partially hydrolyzing the primary gel thus obtained which consists of polyacrylonitrile plasticized with the aqueous salt solution, whereafter the zinc ions are removed from the gel by treating it with a dilute aqueous solution of at least one electrolyte forming an insoluble precipitate therewith. The partial hydrolysis may be carried out either by increasing the acidity of the solution or temperature or both.

Insoluble crosslinked hydrogels are prepared in the form of shaped articles, preferably in either closed or open molds, or in raw castings such as sheets or plates from which the final shaped articles can be manufactured by mechanical processes such as by cutting.

8 Claims, No Drawings

SHAPED ARTICLES FROM INSOLUBLE HYDROGELS AND METHOD OF MANUFACTURING SAME

RELATED APPLICATIONS

This is a continuation-in-part of Ser. No. 526,718, filed Nov. 25, 1974 which is itself a continuation-in-part of Ser. No. 319,309, filed Dec. 29, 1972, which is itself a continuation under Rule 60 of Ser. No. 43,926, filed June 5, 1970, each of which is now abandoned, for which priority under 35 U.S.C. 119 for Czechoslovak Application PV 4200-69 dated June 13, 1969 is claimed. Reference to each of the foregoing is made as if more fully set forth herein.

PRIOR ART

Synthetic hydrogels, i.e. crosslinked or non-crosslinked hydrophilic polymers which swell in water and are stable towards chemicals agents, have recently been widely applied in the field of optics, such as in contact lenses; in surgery and medicine as a substitute or prosthetic material for various tissues; in dentistry, and also for multiple technical purposes, such as in substitution for gelatin in photography; in the production of hydrophilic coatings and lacquers for anti-fogging glass protection; in the preparation of ship coatings preventing the growth of algae and molluscs; in cosmetics; and the like. Heretofore, hydrogels based on polymers and copolymers of glycol methacrylates and glycol acrylates have proven to be the most satisfactory. However, the high costs of the monomer precursor material has proven to be an obstacle to the wide application of the hydrogels. Additionally, when swollen, the above hydrogels are not strong enough for many purposes.

High-elastic gels containing 20-30% of polyacrylonitrile or copolymers of acrylonitrile with a predominant component of acrylonitrile and the remaining 70-80% consisting of a concentrated aqueous solution of zinc chloride, sodium thiocyanate or calcium thiocyanate are known and have been suggested for use in the production of oriented acrylic fibers, bands, tubes and the like. The uses thereof have, however, been limited by the fact that neither zinc nor other ions could be properly washed out. Moreover, the copolymers known so far which contained ionogenic components, such as ethylene sulfonic acid or its salts and which had been prepared in solutions of inorganic salts, contained more than 90% of acrylonitrile and were hydrophilic to only a limited extent, so that they could not be properly included among the hydrogels. In order to remove zinc from the gel-like intermediate fiber, washing in solutions of complexones has been suggested, i.e. in the soluble salts of ethylenediamine tetra-acetic acid, or in solutions of complex-forming organic acids, such as tartaric or citric acid, or in solutions of polyphosphoric acids. The foregoing procedure helped to reduce the zinc content in fibers and other like products at however increased expense. Noteworthy however is that none of the methods described above resulted in the complete removal of zinc.

BACKGROUND OF THE INVENTION

An object of the present invention is a method of producing crosslinked hydrogels of a new type, characterized by increased tensile strength and partly also by a rubber-like elasticity, by high adhesion to substrates and other useful properties.

It is another object of the invention to avoid one or more drawbacks of the prior art.

Other objects and advantages of the invention will become more apparent from the following detailed disclosure and claims.

In furtherance of the invention it has been found that the raw materials used in production of the new hydrogels are cheaper than glycol methacrylates and glycol acrylates of the prior art.

It has now been established that gels produced from copolymers of acrylonitrile containing acrylamide and carboxylic groups, react with dilute solutions of carbonates, hydrogen carbonates, phosphates, chromates and other inorganic salts, acids and hydroxides, preferably alkali or ammonium salts which form insoluble salts with $Zn^{2+}$ ions, so that the precipitate of the corresponding insoluble zinc compound is formed in the surrounding solution, whereas in the gel, the $Zn^{2+}$ ions are substituted, in the first place, by water and by the ions of the alkali metals or by the ammonium ion. On the other hand, anions enter the gel much less readily, owing to the anions already present therein and which are partially bonded to the copolymers. In contrast to the polyacrylonitrile and the copolymers of acrylonitrile with hydrophobic monomers, such as the $C_1$-$C_3$ lower alkyl esters of acrylic and methacrylic acid, the copolymers according to the present invention do not substantially form a surface film of coagulated polymer, which would otherwise prevent or slow down the further diffusion of ions, whereby instead of the gel of the $Zn^{2+}$ salt of the corresponding copolymer, a no less elastic and strongly swelling in water hydrogel is formed simultaneously with the washing out of the zinc chloride. If the surface layer of the hydrogel becomes turbid owing to the formation of a precipitate of an insoluble $Zn^{2+}$ compound the turbidity can easily be removed by using a bath of a dilute mineral acid, such as hydrochloric or nitric acid, and by dipping the hydrogel again into a salt bath which forms an insoluble salt with the $Zn^{2+}$ ions. In this way, substantially perfectly clear, transparent crosslinked hydrogels are obtained, substantially free from zinc and other metals, which might have irritating or other harmful effects when the hydrogels are in contact with living tissue or mucous membranes. In the case of technical uses, a slight turbidity due to negligible amounts of insoluble $Zn^{2+}$ salt does not substantially matter in most cases, so that the aforesaid intermediary treatment with a dilute mineral acid can generally be omitted.

Broadly speaking, the instant invention includes the provision of a method of producing insoluble crosslinked hydrogels by polymerizing 20-40% by weight of acrylonitrile or of a mixture thereof with up to 15 mol percent of other monomers copolymerizable therewith in absence of added crosslinking agents, in a concentrated aqueous solution of zinc chloride, for which some other salt may be partly substituted (i.e. up to about 40% by weight $CaCl_2$, $MgCl_2$ or NaCl), and thereafter carrying out a partial acidic hydrolysis of the polymer plasticized with aqueous $ZnCl_2$ containing solution. The partial hydrolysis in homogeneous acidic medium is carried out either by heating the gel or by increasing the acidity thereof with or without heating. The copolymers are obtained in the form of an elastic gel containing about 20% to about 40% of the polymer. The polymers contain mostly nitrilic and amidic side groups, with a minor amount of carboxylic and acrylimide groups. The content of carboxylic and imidic groups increases with increasing temperature. Zinc chloride and other metal cations are then removed from the gel by treatment of the gel with a solution of a carbonate, hydrogen carbonate, chromate, phosphate, or other compatible agent which forms an insoluble precipitate with the zinc ions.

A minor part of acrylonitrile in the starting monomeric material can be replaced, for example, by up to about 15% molar, of monomers capable of copolymerizing with acrylonitrile, such as of acrylamide, methacrylamide, acrylic acid, methacrylic acid, sodium ethylene sulfonate, mixtures thereof or the like. The term partial acid hydrolysis as employed herein is meant to include a conversion of a part of nitrilic groups, first to amide groups which can be partly further hydrolyzed to carboxylic groups, a small amount of imide groups being simultaneously formed. The term homogeneous acid medium is meant to include gels of polyacrylonitrile and its products of partial hydrolysis, plasticized by aqueous zinc chloride containing solutions, acidified with an inorganic acid soluble therein without forming a precipitate. The expression "mainly nitrilic and amide side groups" means that said groups, both together are present in amounts of about 60 to 100%, (molar), preferably about 80 to 99%. The "minor amount of carboxylic and acrylimide groups" means said groups are present in the product in amounts of about 0 to 40% (molar), preferably about 0.1 to 20%.

More specifically the invention includes the provision of preparing insoluble crosslinked hydrogel copolymers by polymerizing to form a gel about 20 to about 40% by weight of monomeric material consisting predominantly of acrylonitrile in absence of added crosslinking agent in an aqueous salt solution containing zinc chloride as the main component thereof, partially hydrolyzing the thus obtained gel consisting of polyacrylonitrile or its copolymers with up to 15% (molar) of other monomer, plasticized with said salt solution, and removing salt therefrom by treating the gel with a dilute aqueous solution of an electrolyte, the anion of which forms a water-insoluble zinc compound until substantially all of the zinc ions have been removed from said gel and replaced by water, thereby forming an insoluble crosslinked hydrogel.

The insolubility in any solvent is caused by covalent crosslinking which can be explained, in absence of usual cross-linking agents added, only by chain transfer onto the monomer and polymer. Soluble, gel-free copolymers of this kind can be obtained only if the initial acrylonitrile concentration is lower than 15% by weight; at 20% the product is sparingly but markedly crosslinked and therefore insoluble. Higher initial concentrations than 35% up to about 40% by weight of acrylonitrile are feasible, only the dissipation of the heat of polymerization is more difficult, and the shrinking is rather high.

The crosslinking by chain transfer in absence of any added crosslinking agents (usually a monomer with more than one polymerizable double bond), is caused by increasing the initial acrylonitrile concentration to 20–40% by weight, related to the weight of the polymerization batch as a whole. Zinc chloride solutions do not cause chain transfer onto the solvent. It is understood, naturally, than no compound causing chain transfer is present as an impurity or added intentionally, because in such a case the chain transfer onto the monomer would be either reduced or fully avoided. The degree of crosslinking depends on the initial acrylonitrile concentration, increasing proportionally therewith.

The crosslinking by the chain-transfer onto the monomer posseses considerable advantages. First, the crosslinks possess the same chemical composition as the main chains, containing no easily hydrolyzable or chemically attackable chain links. Second, the crosslinks are, in average, considerably longer than in case of using a common crosslinking agent such as ethylene glycol dimethacrylate. This can be explained by the fact that chain-transfer onto the monomer results in a tri-functional co-monomer having one function, namely the free radical, more reactive than the two other functions, namely the double bond. Thus, a sufficiently long polymer chain has grown on the free radical prior to the reaction of the double bond with another growing free radical. Moreover, the crosslinks are formed by a recombination of two growing free radicals so that their final length is still longer.

The absence of easily hydrolyzable chain links results in increased chemical stability, the presence of long crosslinks improves physical and physico-chemical characteristics of the product (elasticity, strength, swelling capacity, structural strength and the like).

The polymerization of acrylonitrile in an aqueous solution of an inorganic salt, the main component of which is formed by zinc chloride, followed by partial acid hydrolysis has in this case many advantages. Firstly, a concentrated aqueous solution of zinc chloride is a good solvent for acrylonitrile, as well as for its polymers and copolymers formed following the partial hydrolysis. Organic solvents, such as dimethylformamide or dimethylsulfoxide, are not well suited for this purpose, since they lead to a considerable chain transfer, thus largely reducing the degree of polymerization and are further inflammable or poisonous, and still further their recovery is comparatively difficult. Inorganic salts, on the other hand, exhibit only a negligible chain transfer in free radical polymerization, so that chain transfer onto the monomer leads to branching and crosslinking. Moreover, said salt solutions have the advantage that they substantially do not dissolve molecular oxygen, so that in most cases no inhibition is observed, even if the polymerization is not carried out under an inert gas. The method according to the present invention provides for virtually complete recovery of the solvent in the form of an insoluble salt, as almost no zinc is present in the waste water. In this way, the most difficult problem of waste water pollution is solved, with the additional advantage of the recovery of a metal in a time of shortages. If a countercurrent system of washing is employed, only a small amount of the salt used for the precipitation is transferred into the waste water; and if a harmless salt, such as sodium hydrogen carbonate has been used, the waste water pollution is negligible.

The electrolytes used for the precipitation of zinc cations can be chosen in such a way as to yield zinc in the form of a white or coloured pigment or raw material suitable for being used in pigment preparation. This again increases the economy of the process.

PREFERRED EMBODIMENT

The copolymers of acrylonitrile with acrylamide and acrylic acid can be produced with special advantage by preparing an elastic crosslinked gel homopolymer of acrylonitrile by polymerizing 20–40% by weight of acrylonitrile at low temperatures and in absence of added crosslinking agents using effective redox initiators in a solution containing zinc chloride as its main component; the elastic crosslinked gel thus obtained is then subjected to partial hydrolysis prior to the removal of zinc. For this partial hydrolysis, heating to about 80° to about 130° C. for several hours is to be recommended. Temperatures ranging from about 50° to 80° C. may also be employed with good results. In this way, one part of the nitrile groups is transformed into amidic and carboxylic groups, and the distribution of the amidic and carboxylic groups in the copolymer is as a rule, more advantageous as in the case of copolymerization. Heating is advantageously carried out in such a way as to prevent excessive dehydration, that is, preferably in a closed vessel in the presence of superheated water vapor. The vapor should not be permitted to condense on the gel, thereby avoiding an irregular partial leaching of the salts from the surface. Temperatures of about 50° to about 150° C. are acceptable.

Another way to accelerate the partial hydrolysis is to increase the acidity of the homogeneous gel, consisting mainly of polyacrylonitrile plasticized with the zinc chloride-containing aqueous solution. The acification can be performed by adding a small amount of a mineral acid, preferably sulfuric acid, into the polymerizing mixture. It is better, however, to expose the zinc chloride-plasticized (primary) gel to a gaseous hydrogen halide which diffuses with sufficient velocity into the gel. The resultant increase in acidity is very high and the partial hydrolysis takes place at any convenient temperature, with or without heating. Operative hydrogen halides include HF, HCl, HBr and the like.

The amount of mineral acid employed may vary from about 0.01 to 40%, preferably about 0.1 to 5% by weight. The concentration of gaseous hydrogen halide employed is variable, and may range from about 0.01 to 100%, preferably about 0.1 to 50%. It is generally exposed to the gel until such time as the desired effect is obtained. The treatment with gaseous hydrogen halide can be advantageously carried out at decreased temperatures and increased pressure, to delay the partial hydrolysis until the whole cast article is homogeneously penetrated by the hydrogen halide. Then, if desired, the temperature can be increased to increase the rate of hydrolysis.

The achieved degree of hydrolysis can be followed either by chemical or spectral analysis, or, most simply, by determining the swelling capacity of the thoroughly washed hydrogel.

Crosslinked hydrogels prepared according to the invention are chemically and physically stable, and can be sterilized in neutral or weakly acid medium by boiling without substantial damage. They are also physiologically inert.

Washing of the partly hydrolyzed gel in a solution of an agent which precipitates the ions of zinc or other metals to be removed from the gel can be carried out in such manner that in the first washing, the concentration is at its lowest and in the last one, at its highest, that is, the process is a countercurrent one, either continuous or stepwise. In the case of a continuous process the precipitate formed can be removed continuously or intermittently by passing the liquid suspension through a filter or a centrifuge.

The following Examples are illustrative in accordance with the invention. It will be understood that numerous modifications can readily be made in light of the guiding principles and teachings of the present invention disclosed above. The Examples given are, therefore, by way of illustration and not by way of limitation. All parts, proportions and ratios listed in the Examples and appended claims are in terms of weight unless otherwise noted. The percentages of concentrations are related to the weight of the batch as a whole which corresponds to 100%.

EXAMPLE 1

27 Parts by weight of acrylonitrile are dissolved in 73 parts by weight of a mixture of concentrated aqueous solution of zinc chloride and calcium chloride in a volume ratio of 3:2. The resulting solution is degassed and cooled to $-15°$ C.; a redox initiator is added to the solution and the mixture is poured into a glass mold, plate distance 1 mm. The plates are $30 \times 30$ cm in size. The onset of the polymerization is observed on the basis of the viscosity of the rest of the solution. As soon as the viscosity begins to increase markedly, the glass mold is placed in a cooling box at $-25°$ C. The contents of the mold, slightly turbid immediately after the solution has been poured into it, become clear in the course of polymerization. After 2 hours the mold is removed from the cooling box and left in the air at room temperature for another hour. Then the mold is put into a larger dish, placed in a drying oven and heated to 125° C. for two hours. After dismounting, the strong, rubberlike-elastic, yellowish, transparent foil is cut into strips, 3.9 cm in size.

The individual strips are freed from zinc chloride and calcium chloride by immersing them in dilute aqueous solutions of sodium hydrogen carbonate, sodium carbonate, potassium chromate, and ammonium hydrogen phosphate at pH 7 to 11. The solutions are changed as long as a precipitate is formed. After this, the strips are washed in a 2% hydrochloric acid and immersed for 24 hours into distilled water, which is changed four times during that time.

The hydrogel thus obtained is very elastic. If transformed into the sodium salt by reaction with weak alkali, it is quite clear and considerably swollen in water. A strip freed from zinc chloride and calcium chloride in a solution of alkali chromate is transparent and bright yellow in color.

If the samples are in the hydrogen form, they can be sterilized by boiling without change. Boiling in the sodium form leads to enormous swelling and final disintegration and dissolution of the samples by breaking covalent crosslinks. The sterilization of the articles from the crosslinked copolymer of acrylonitrile with acrylamide and acrylic acid (whose units are formed additionally by a partial hydrolysis on heating of the original gel) can therefore be carried out in a hydrogen form preferably at pH 4 to pH 7; the copolymer is then placed into a sterile physiological solution or a dilute solution of sodium hydrogen carbonate; when it is again transformed into the sodium form, swells to equilibrium and becomes perfectly transparent. It is highly swellable in highly polar solvents of polyacrylonitrile such as dimethyl formamide, but absolutely insoluble therein, provided that covalent bonds are not broken by a too long heating at temperatures higher than 100° C.

EXAMPLE 2

30 Parts by weight of acrylonitrile are dissolved in 70 parts of aqueous 70% zinc chloride solution, the mixture is cooled down to $-15°$ C. and reaction initiated with a redox polymerization catalyst consisting of equal parts of potassium metabisulfite and ammonium persulfate (0.1% each) in the form of a 5% aqueous solution. The solution is then poured into a flat glass mold (thickness 2 mm) precooled to −25° C. to −30° C. The filled mold is then kept at −25° C. After 6 hours the mold is removed from the refrigerator and kept for another two hours at room temperature. Then the mold is dismounted and the tough, rubbery sheet of zinc chloride-plasticized polyacrylonitrile fastened with one of its edges onto the inner side of a tight lid covering a 5 liter glass vessel on the bottom of which 150 ml of 37% hydrochloric acid have been poured. The exposure of the gel to the hydrogen chloride lasts for 36 hours at 15° C. Then the sheet of the partly hydrolyzed polyacrylonitrile is immersed into 0.5% aqueous sodium chromate solution, the bath being renewed several times until no further yellow precipitate is formed. After thorough washing in water, in 0.5% sulfuric acid and in water again, a transparent, tough, rubbery sheet is obtained, containing 53% water at swelling equilibrium. The dry substance is a copolymer containing approximately 40% acrylonitrile, 55% acrylamide and 5% acrylic acid units, with a negligible amount of acrylimide groups.

The hydrogel is fully insoluble in any solvent, including highly polar solvents capable of dissolving polyacrylonitrile such as dimethyl formamide, dimethyl sulfoxide or a 60% aqueous sodium thiocyanate solution. The hydrogel only swells in said solvents, and if the solvent is removed by washing the gel thoroughly in water, the article regains its original size. The general shape of the article, e.g. of a strip of said sheet, remains unchanged during the whole process of swelling and de-swelling. Its edges remain sharp even at the highest swelling degree. This is a positive proof of a covalently crosslinked structure.

When implanted in rats, the hydrogel causes no irritation or inflammation of the surrouding tissue and is encapsulated by a thin layer of ligament tissue only.

The precipitated zinc chromate can be used in pigment manufacture.

EXAMPLE 3

The process described in Example 1 is repeated except that 2% by weight of sodium ethylene sulfonate and 0.5% of 96% sulfuric acid are added to the monomer mixture. The obtained primary gel is similar to that of Example 1, but the increased acidity caused mainly by the presence of strongly acidic sulfonic groups greatly accelerates the hydrolysis so that either the time of heating or the temperature can be substantially reduced, or at the same conditions, the degree of hydrolysis can be increased.

Similar results to those set out in the preceding Examples are obtained if up to 15% (mol) of acrylonitrile is replaced by acrylic or methacrylic acid or by their respective amides.

The insoluble copolymer in the H-form can be washed with hot water and further treated, for example, for additional crosslinking. As crosslinking agent for the polymer any bifunctional or trifunctional compound reacting with the side groups can be used, incl. formaldehyde or trivalent cations of aluminium, iron and chromium.

A part of the zinc chloride can be substituted by cheaper salts in a known manner, e.g. by calcium, sodium or magnesium chloride, and the like, as is known in the art.

Since it is obvious that numerous changes and modifications can be made in the above-described details without departing from the spirit and nature of the invention, it is to be understood that all such changes and modifications are included within the scope of the invention.

The term "shaped articles" means various objects which can be prepared by polymerization casting as described above, or by mechanical processing of the raw castings such as sheets or rods. It is obvious that the insoluble elastic material, containing covalent crosslinks, cannot be used for spinning fibers or similar processes such as extrusion in which either dissolution or melting of the material is necessary.

The term "insoluble" means incapable of purely physical dissolution in any solvent including solvents of non-crosslinked polyacrylonitrile such as dimethyl sulfoxide, dimethyl formamide or aqueous solutions of sodium or calcium thiocyanate.

What I claim is:

1. A method of manufacturing shaped articles from insoluble crosslinked hydrogels by polymerization-casting is a closed or open mold an initiated solution of about 20 to about 40% by weight of monomeric material consisting predominantly of acrylonitrile in absence of added crosslinking agent in an aqueous solution containing zinc chloride as the main component thereof, partially hydrolyzing the thus obtained insoluble crosslinked gel consisting of polyacrylonitrile or of acrylonitrile copolymer with up to 15% (mol) or other monomers copolymerizable with acrylonitrile in the presence of an acidic medium, said insoluble crosslinked gel being plasticized with said salt solution, and removing salts from the thus obtained partially hydrolyzed castings by treating them with a dilute aqueous solution of an electrolyte the anion of which forms a precipitate of the corresponding water-insoluble zinc compound in the solution surrounding said gel, until substantially all of the zinc ions have been removed from said gel, thereby forming a water-swelled crosslinked hydrogel shaped article.

2. A method according to claim 1 wherein said electrolyte is selected from the group consisting of alkali metal and ammonium-carbonates, bicarbonates, phosphates, chromates, bichromates and hydroxides.

3. A method according to claim 1 wherein said monomeric material contains an amount up to about 15% (molar) of a comonomer selected from the group consisting of methacrylonitrile, acrylamide, methacrylamide, acrylic acid, methacrylic acid, sodium ethylene sulfonate and compatible mixtures thereof.

4. A method according to claim 1, wherein said partial hydrolysis is accelerated by exposing said primary gel to gaseous hydrogen halide.

5. A method according to claim 4 wherein said gel is heated to a temperature of up to about 100° C. after having been contacted with gaseous hydrogen halide.

6. A method according to claim 1, wherein said partial hydrolysis is accelerated by heating said gel in a sealed vessel to a temperature of about 50° to about 150° C.

7. A method according to claim 1 which comprises conducting said partial hydrolysis until 20-90% of the nitrile groups have been hydrolyzed.

8. A chemically and physically stable, insoluble but water-swellable crosslinked hydrogel shaped article produced by the process of claim 1.

* * * * *